United States Patent [19]

Tanahashi

[11] Patent Number: 5,310,168
[45] Date of Patent: May 10, 1994

[54] FLUID-FILLED CYLINDRICAL ELASTIC MOUNT HAVING ANNULAR FLUID CHAMBER WITH CONSTANT CROSS SECTIONAL AREA OVER THE ENTIRE CIRCUMFERENCE

[75] Inventor: Hiroaki Tanahashi, Komaki, Japan

[73] Assignee: Tokai Rubber Industries, Ltd., Komaki, Japan

[21] Appl. No.: 51,290

[22] Filed: Apr. 23, 1993

Related U.S. Application Data

[63] Continuation of Ser. No. 789,548, Nov. 8, 1991, abandoned, which is a continuation of Ser. No. 555,643, Jul. 23, 1990, abandoned.

[30] Foreign Application Priority Data

Jul. 27, 1989 [JP] Japan .................................. 1-88167

[51] Int. Cl.$^5$ .............................. F16F 7/00; F16F 9/00
[52] U.S. Cl. ............................ 267/140.12; 267/140.5
[58] Field of Search ............ 267/141.7, 140.11–140.13, 267/219, 35, 141.3; 248/562, 636, 638; 180/300, 312, 902

[56] References Cited

U.S. PATENT DOCUMENTS

| 4,032,202 | 6/1977 | Ishikawa et al. | 267/281 |
| 4,702,346 | 10/1987 | Uno et al. | 267/140.12 |
| 4,786,036 | 11/1988 | Kanda | 248/562 |
| 4,790,520 | 12/1988 | Tanaka et al. | 267/219 |
| 4,840,357 | 6/1989 | Jouade | 267/219 |
| 4,865,299 | 9/1989 | Goto | 267/141.2 |
| 4,883,260 | 11/1989 | Kanda | 280/710 |
| 4,964,623 | 10/1990 | Thorn | 267/140.12 |

FOREIGN PATENT DOCUMENTS

| 0355269 | 2/1990 | European Pat. Off. | 267/140.12 |
| 3831284 | 4/1989 | Fed. Rep. of Germany . | |
| 48-310 | 1/1973 | Japan . | |
| 48-36151 | 11/1973 | Japan . | |
| 52-16554 | 5/1977 | Japan . | |
| 1063863 | 3/1967 | United Kingdom . | |

Primary Examiner—Robert J. Oberleitner
Assistant Examiner—Chris Schwartz
Attorney, Agent, or Firm—Oliff & Berridge

[57] ABSTRACT

A fluid-filled cylindrical elastic mount having an inner sleeve, an outer sleeve disposed radially outwardly of the inner sleeve with a predetermined radial spacing therebetween, and an elastic body interposed between the inner and outer sleeves for elastically connecting the inner and outer sleeves. The fluid-filled elastic mount has a generally annular fluid chamber formed between the inner and outer sleeves so as to extend over the entire circumference of the mount. The fluid chamber has a substantially constant cross sectional area over the entire circumference thereof, is filled with a non-compressible fluid having a kinematic viscosity of not higher than 100 centistokes, and undergoes substantially no deformation upon a rise in pressure due to the presence of a stopper portion provided in the chamber which may consist of a ring-like rigid member.

9 Claims, 2 Drawing Sheets

FLUID-FILLED CYLINDRICAL ELASTIC MOUNT HAVING ANNULAR FLUID CHAMBER WITH CONSTANT CROSS SECTIONAL AREA OVER THE ENTIRE CIRCUMFERENCE

This is a continuation of application Ser. No. 07/789,548 filed Nov. 8, 1991, now abandoned, which in turn is a continuation of Ser. No. 07/555,643 filed Jul. 23, 1990, now abandoned.

BACKGROUND OF THE INVENTION

1. Field of the Invention

The present invention relates in general to a fluid-filled cylindrical elastic mount capable of damping and/or isolating vibrations applied thereto, based on flows of a fluid contained therein. More particularly, the invention is concerned with such a fluid-filled elastic mount capable of exhibiting sufficient damping and/or isolating characteristics with respect to the vibrations applied in any radial direction perpendicular to the axis of the mount.

2. Discussion of the Prior Art

A cylindrical elastic mount is known as a device for elastically or flexibly connecting two members in a vibration system in a vibration damping or isolating manner. Examples of such a cylindrical elastic mount are disclosed in laid-open Publication No. 48-310 of examined Japanese Utility Model Application and British Patent No. 1063863. The cylindrical elastic mount disclosed therein has an inner and an outer sleeve which are made of a metallic material and are disposed in radially spaced-apart relation with each other. Between these inner and outer sleeves, there is interposed an elastic body for elastically connecting the two sleeves. The thus constructed elastic mount is adapted to damp and/or isolate vibrations which are applied between the inner and outer sleeves primarily in radial directions perpendicular to the axis of the mount. This type of cylindrical elastic mount is widely used as a differential mount, engine mount, body mount or suspension bushing for a motor vehicle, for example.

To meet increasing requirements for a higher degree of vibration damping capability, a so-called fluid-filled mount has been recently proposed, as disclosed in Publication Nos. 48-36151 and 52-16554 of examined Japanese Patent Applications. A fluid-filled elastic mount as disclosed in these publications has two fluid chambers which are formed between the inner and outer sleeves, and are disposed opposite to each other in a radial direction of the mount. The two fluid chambers are held in fluid communication with each other through a suitable orifice passage, so that applied vibrations may be effectively damped by resonance of a fluid flowing through the orifice passage. The thus constructed fluid-filled elastic mount can provide excellent vibration damping characteristics, which have not been obtained by the above-described elastic mount that utilizes only the elastic body for damping the input vibrations.

In the fluid-filled elastic mount, effective flows of the fluid between the two fluid chambers through the orifice passage take place as a result of relative pressure changes between the two chambers, when the mount receives vibrations in the radial direction in which the two fluid chambers are opposed to each other. Upon application of vibrations in the other radial directions of the mount, however, the fluid-filled elastic mount is not able to provide a satisfactory effect of damping the applied vibrations.

However, it is rather difficult for the fluid-filled elastic mount to provide a sufficient degree of damping and/or isolating effect for the vibrations applied in all the radial directions perpendicular to the axis of the mount. Even if the elastic mount receives vibrations applied in only one radial direction, the installation of the mount on a motor vehicle, for example, must be effected so that the direction in which the two fluid chambers are opposed to each other coincides with the radial direction in which the vibrations are applied to the mount, since the mount exhibits sufficient damping characteristics only for the vibrations applied in that direction. Thus, cumbersome procedures and considerable precision are needed for the installation of the conventional fluid-filled elastic mount.

SUMMARY OF THE INVENTION

The present invention was made in the light of the prior art situations as described above. It is therefore an object of the present invention to provide a fluid-filled cylindrical elastic mount capable of effectively damping and/or isolating input vibrations which are applied in any radial direction of the mount, based on flows of a fluid contained therein.

The above object of the present invention may be achieved according to the principle of the present invention, which provides a fluid-filled cylindrical elastic mount for flexibly connecting two members, comprising (a) an inner sleeve attached to one of the two members to be flexibly connected; (b) an outer sleeve attached to the other of the two members, and disposed radially outwardly of the inner sleeve with a predetermined radial spacing therebetween; (c) an elastic body interposed between the inner and outer sleeves for elastically connecting the inner and outer sleeves; and (d) means for defining a generally annular fluid chamber formed between the inner and outer sleeves so as to extend over the entire circumference of the mount, the fluid chamber having a substantially constant cross sectional area over the entire circumference thereof, and being filled with a non-compressible fluid having a kinematic viscosity of not higher than 100 centistokes.

In the fluid-filled cylindrical elastic mount of the present invention constructed as described above, the annular fluid chamber filled with the non-compressible fluid is formed so as to extend over the entire circumference of the mount. Therefore, the fluid in the fluid chamber is forced to repeatedly flow in opposite circumferential directions, when the mount receives input vibrations in any radial direction perpendicular to the axis of the mount. Since the fluid chamber has a substantially constant cross sectional area over the entire circumference thereof, the present elastic mount can provide an excellent damping and/or isolating effect with respect to the input vibrations applied in any radial direction or any direction perpendicular to the axis of the mount, based on resonance of the fluid flowing within the fluid chamber.

Preferably, the non-compressible fluid has a kinematic viscosity of not higher than 30 centistokes.

In one form of the present invention, the elastic body has a pair of grooves which are opposed to each other in a diametrical direction of the mount, and which are open to the outer surface of the elastic body, and a pair of through-holes formed therethrough, which are opposed to each other in a diametrical direction perpendicular to the diametrical direction of the mount. In this case, the fluid chamber has a first portion which is defined between the inner wall of the groove and the inner surface of the outer sleeve, and a second portion which corresponds to the through-holes of the elastic body. The grooves may be arcuate grooves, while the through-holes may be substantially straight through-holes.

The present fluid-filled elastic mount may further have an intermediate sleeve disposed between the outer sleeve and the elastic body. The intermediate sleeve has a pair of windows which are aligned with the pair of grooves of the elastic body, so that the grooves are open to the outer surface of the intermediate sleeve.

In another form of the present invention, the elastic body has an annular groove which extends over the entire circumference thereof, and which is open to the outer surface of the elastic body. In this case, the fluid chamber is defined between the inner wall of the groove and the inner surface of the outer sleeve.

The present fluid-filled elastic mount may further include a stopper accommodated in the fluid chamber, for limiting an amount of relative displacement of the inner and outer sleeves in the radial directions thereof. The stopper may be an integral part of the elastic body.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
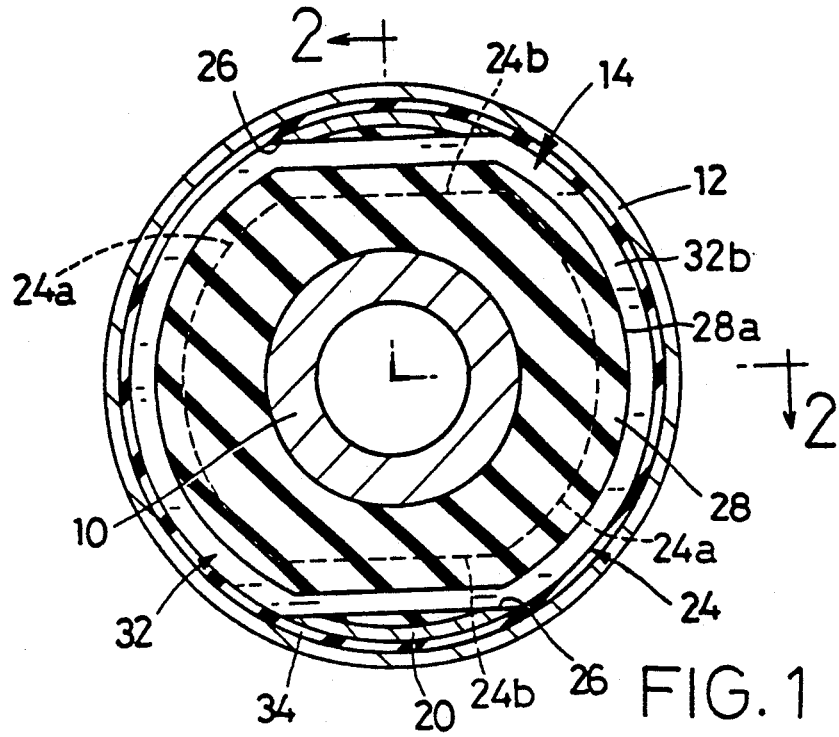
FIG. 1 is an elevational view in transverse cross section of one embodiment of a fluid-filled cylindrical elastic mount of the invention in the form of a differential mount for a motor vehicle.
Figure 2:
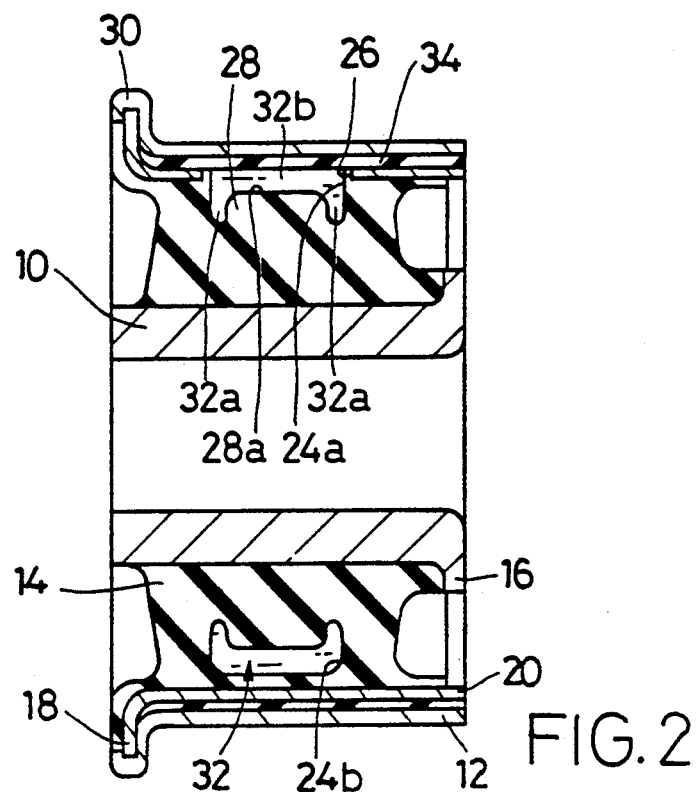
FIG. 2 is an elevational view in axial cross section taken along line 2—2 of FIG. 1.

Referring first to FIGS. 1 and 2, there is shown a fluid-filled cylindrical elastic differential mount used for a motor vehicle. In these figures, reference numerals 10, 12 respectively denote an inner and an outer sleeve which are made of metal and ar disposed concentrically with each other. The outer sleeve 12 is disposed radially outwardly of the inner sleeve 10, with a suitable radial spacing left therebetween. Between the inner and outer sleeves 10, 12, there is interposed an elastic body 14 such that the two sleeves 10, 12 are elastically connected to each other by the elastic body 14. In use, the differential mount is installed on the motor vehicle such that the inner sleeve 10 is connected to the body of the vehicle while the outer sleeve 12 is fixed to a member connected to a differential gear of the vehicle, so that the differential gear is elastically or flexibly mounted on the vehicle body via the differential mount.

More specifically described, the inner sleeve 10 is a generally cylindrical member having a comparatively large wall thickness. This inner sleeve 10 has a flange 16 formed at one axial end as an integral part thereof. Radially outwardly of the inner sleeve 10, there is disposed a relatively thin-walled, generally cylindrical metallic intermediate sleeve 20, such that the intermediate sleeve 20 is concentric with the inner sleeve 10, with a suitable radial spacing therebetween. This intermediate sleeve 20 has a flange 18 formed as an integral part thereof, at one axial end remote from the flange 16 of the inner sleeve 10.

Figure 3:
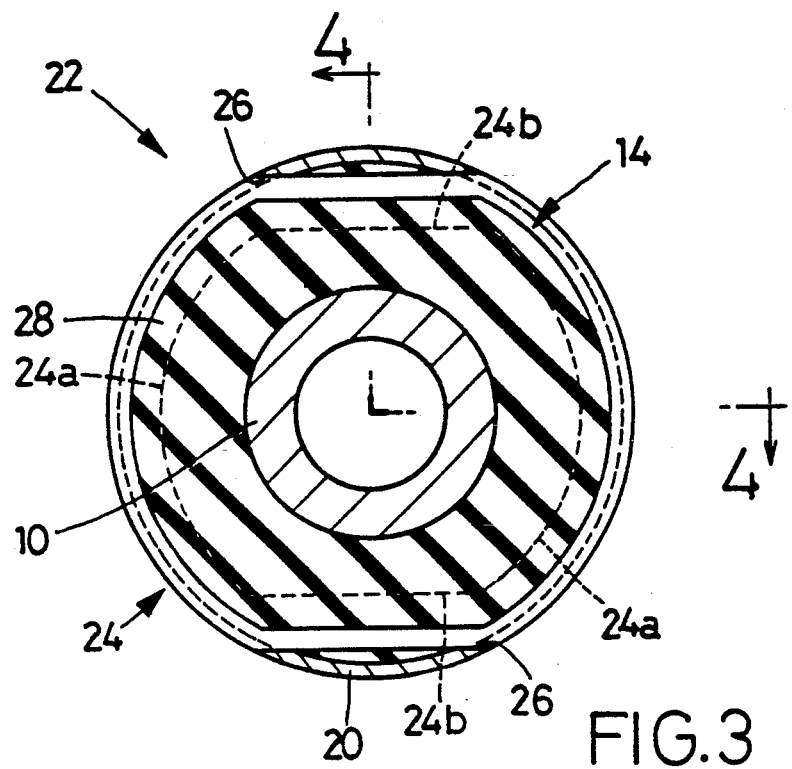
FIG. 3 is a transverse cross sectional view of an inner assembly of the differential mount of FIG. 1, which is produced as an intermediate product by vulcanizing a rubber material to form an elastic body secured to other inner members of the mount.
Figure 4:
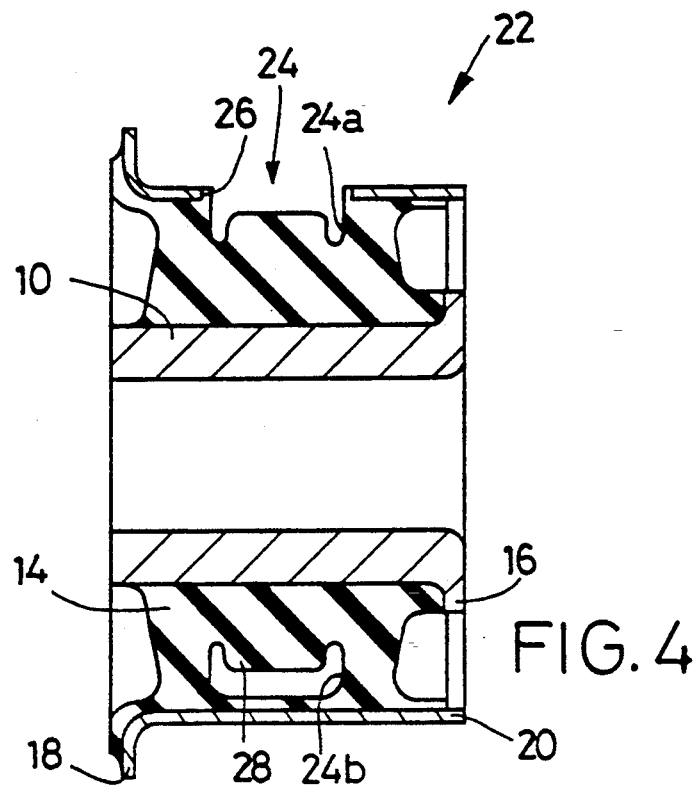
FIG. 4 is a cross sectional view taken along line 4—4 of FIG. 3.

The elastic body 14 is interposed between the inner sleeve 10 and the intermediate sleeve 20. This elastic body 14 is a relatively thick-walled, generally annular member formed of a suitable rubber material. The inner sleeve 10, intermediate sleeve 20 and elastic body 14 cooperate to constitute an inner assembly 22 of the differential mount, as shown in FIGS. 3 and 4. This inner assembly 22 is prepared as an intermediate product during manufacture of the mount, by vulcanizing an unvulcanized rubber material in a suitable mold, to form the elastic body 14 secured to the outer circumferential surface of the inner sleeve 10, and to the inner circumferential surface of the intermediate sleeve 20.

The elastic body 14 has a generally annular void 24 formed in its axially intermediate portion so as to extend in the circumferential direction thereof over the entire circumference of the body 14. On the other hand, the intermediate sleeve 20 has a pair of rectangular windows 26 formed through axially intermediate portions thereof which are opposed to each other in one diametrical direction of the sleeve 20. These windows 26 are aligned with the respective openings of the void 24 formed in the elastic body 14, so that the annular void 24 is open on the outer circumferential surface of the inner assembly 22, through these windows 26.

In other words, the annular void 24 includes two arcuate portions in the form of arcuate grooves 24a, 24a, which correspond to the windows 26, 26 of the intermediate sleeve 20, and which are open to the outer circumferential surface of the inner assembly 22. The annular void 24 further includes two parallel straight portions in the form of straight through-holes 24b, 24b formed through the elastic body 14, which portions are opposed to each other in the diametrical direction perpendicular to the above-indicated direction in which the windows 26 are opposed to each other. These straight through-holes 24b have the same cross sectional area as the arcuate grooves 24a. Namely, the annular void 24 has a constant cross sectional area over the entire circumference thereof. In this particular embodiment, the grooves 24a and the through-holes 24b of the void 24 have substantially the same configuration as well as the same cross sectional area, as shown in FIG. 4. On the bottom wall of the annular void 24, there is provided a stopper portion 28 which is formed integrally with the elastic body 14, and which extends over the entire circumference of the elastic body 14. Namely, the stopper portion 28 of the elastic body 14 protrudes radially outward from the bottom wall of the void 24 by a suitable radial distance. This stopper portion 28 serves to limit an amount of relative displacement of the inner sleeve 10 and the outer sleeve 12 (which will be described) in the radial directions thereof.

The thus constructed inner assembly 22 of FIGS. 3 and 4 is radially inwardly compressed at the intermediate sleeve 20, as needed, so as to give a suitable degree of preliminary compression to the elastic body 14. Subsequently, the outer sleeve 12 is fitted on the outer circumferential surface of the inner assembly 22, as shown in FIGS. 1 and 2, and the obtained product 12, 22 is subjected to a drawing operation by using eight dies, for example, so that the outer sleeve 12 is firmly forced against the outer surface of the inner assembly 22. The outer sleeve 12 is a generally cylindrical member having a comparatively small wall thickness, and has a caulking portion 30 formed at one axial end as an integral part thereof. With the caulking portion 30 of the outer sleeve 12 being caulked against the flange 18 of the intermediate sleeve 20, the sleeve 12 is integrally assembled with the inner assembly 22 including the inner sleeve 10, intermediate sleeve 20 and elastic body 14.

With the outer sleeve 12 mounted on the inner assembly 22 of FIG. 3 and 4, the openings of the arcuate grooves 24a aligned with the windows 26 are closed by the outer sleeve 12, whereby an enclosed chamber corresponding to the annular void 24 is defined by the outer sleeve 12 and the elastic body 14. This enclosed chamber is filled with a suitable non-compressible fluid, to thereby provide an generally annular fluid chamber 32 which extends between the inner and outer sleeves 10, 12, and which has a substantially constant cross sectional area over the entire circumference thereof. The inner circumferential surface of the outer sleeve 12 is substantially entirely covered by a relatively thin-walled sealing rubber layer 34, to secure fluid tightness of the fluid chamber 32 at the interface between the outer sleeve 12 and the intermediate sleeve 20.

The non-compressible fluid contained in the fluid chamber 32 has a relatively low viscosity, for a sufficient degree of fluidity of the fluid, to thereby ensure a desired vibration damping and/or isolating effect based on resonance of the fluid. More specifically, the kinematic viscosity of the fluid is not higher than 100 centistokes, and preferably not higher than 30 centistokes. For example, the non-compressible fluid is suitably selected from the group which includes water, alkylene glycol, polyalkylene glycol, silicone oil, and mixture thereof. If the kinematic viscosity of the fluid exceeds 100 centistokes, the obtained elastic mount suffers from an excessively high flow resistance of the fluid within the fluid chamber 32, and accordingly suffers from an insufficient vibration damping and/or isolating capability.

The filling of the fluid chamber 32 with the fluid as described above may be conducted by mounting the outer sleeve 12 on the inner assembly 22, within a mass of the selected fluid contained in a suitable vessel.

In the differential mount constructed as described above, when a vibrational load is applied between the inner and outer sleeves 10, 12 in a load-receiving direction perpendicular to the axis of the mount, these inner and outer sleeves 10, 12 are displaced relative to each other in the corresponding radial direction of the mount. As a result, relative volumetric changes occur between the diametrically opposite portions of the fluid chamber 32, which are opposed to each other in the above-indicated load-receiving radial direction, thereby causing repetitive flows of the fluid in the fluid chamber 32 between the diametrically opposite portions as described above, in the opposite circumferential directions of the mount. The cross sectional area of the fluid chamber 32 is suitably dimensioned or tuned so that the differential mount can provide a high damping effect with respect to low-frequency vibrations, and a sufficiently low dynamic spring constant with respect to high-frequency vibrations.

The instant differential mount is constructed such that the fluid chamber 32 formed in the elastic body 14 extends over the entire circumference of the mount. Therefore, the fluid in the fluid chamber 32 is forced to flow in the opposite circumferential directions of the mount, with respect to the vibrations applied in any radial directions perpendicular to the axis of the mount. Since the fluid chamber 32 has a substantially constant cross sectional area over the entire circumference thereof, the vibrational load applied in any radial direction may cause the fluid to flow between the appropriate diametrically opposite portions of the fluid chamber 32, through the other orifice passage portions which have a substantially constant cross sectional area and length irrespective of the input direction of the vibrational load. Thus, the instant differential mount is capable of providing constant vibration damping and isolating effects, based on the resonance of the fluid flowing through the orifice passage as described above.

The instant differential mount can exhibit excellent vibration damping/isolating capability with respect to the input vibrations applied in all radial directions perpendicular to the axis of the mount. Therefore, the use of the instant mount is effective to reduce the amount of transmission of the vibrations between the vehicle body and the differential gear. In addition, the instant differential mount exhibits similar damping/isolating characteristics with respect to the vibrations applied in any radial direction perpendicular to the axis of the mount. Therefore, the instant mount need not be precisely positioned in the radial direction thereof, when the mount is installed on the vehicle. This means a significantly improved efficiency in the installation of the mount on the vehicle.

In the differential mount according to the instant embodiment, the annular fluid chamber 32 has substantially the same cross sectional shape as well as the same cross sectional area over the entire circumference thereof. Therefore, the fluid in the fluid chamber 32 is allowed to smoothly flow through the orifice passage portions of the fluid chamber 32 upon application of the vibrational load, to thereby assure intended vibration damping and isolating effects of the mount.

In the differential mount of the instant embodiment, the stopper portion 28 protrudes from the bottom wall of the fluid chamber 32 so as to partially divide the chamber 32 so as to provide axially opposite end portions as indicated in FIG. 2. When a vibrational load is applied between the inner and outer sleeves 10, 12 in the axial direction of the mount, the fluid is forced to flow between the axially opposite end portions 32a of the fluid chamber 32, through a gap 32b defined between a radial end face 28a of the stopper portion 28 and the sealing rubber layer 34. This stopper portion 28 may be suitably dimensioned or tuned so that the instant mount can exhibit a predetermined vibration damping and/or isolating effect with respect to the axially applied vibrational load, based on the resonance of the fluid flowing through the gap as described above.

While the present invention has been described in detail in its presently preferred embodiment, for illustrative purpose only, it is to be understood that the invention is not limited to the details of the illustrated embodiment.

For example, the annular void 24 formed in the elastic body 14 of the inner assembly 22 may consist solely of an annular groove which extends over the entire circumference of the elastic body 14, and which is open to the outer circumference of the intermediate sleeve 20.

The elastic mount according to the present invention can provide sufficient vibration damping and isolating effects, based on the resonance of the fluid flowing through the fluid chamber 32, as long as the cross sectional area of the fluid chamber 32 is substantially constant over the entire circumference of the chamber 32. Accordingly, the fluid chamber need not have the same cross sectional shape over the entire circumference thereof, as in the illustrated embodiment.

The stopper portion 28 provided within the fluid chamber 28 may consist of a ring-like, rigid member which is press-fitted on the inner sleeve 10. This arrangement will effectively prevent the inner and outer sleeves 10, 12 from being excessively displaced relative to each other in the radial directions thereof. It is to be understood that the stopper portion 28 is not essential to accomplish the object of the present invention as described above.

Although the illustrated embodiment is adapted to be used as a differential mount for a motor vehicle, the concept of the invention may be embodied as engine mounts and suspension bushings for a motor vehicle, and other fluid-filled elastic mounts whose applications are not limited to the motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount for flexibly connecting two members, comprising
    an inner sleeve attached to one of the two members to be flexibly connected;
    an outer sleeve having a circumference and attached to the other of said two members, and disposed radially outwardly of said inner sleeve with a predetermined radial spacing therebetween;
    an elastic body interposed between said inner and outer sleeves for elastically connecting the inner and outer sleeves; and
    means for defining a generally annular fluid chamber formed between said inner and outer sleeves so as to extend over the entire circumference of the mount, said generally annular fluid chamber defining a fluid passage having an effective length not greater than said circumference of said outer sleeve, said fluid chamber having a substantially constant cross sectional area over the entire circumference thereof, so that the mount exhibits a substantially constant damping effect for vibrations received in all radial directions of the mount, said fluid chamber being filled with a non-compressible fluid having a kinematic viscosity of not higher than 100 centistokes, said annular fluid chamber undergoing substantially no deformation due to a rise in pressure of said fluid upon vibration application,
    said means for defining a generally annular fluid chamber comprising said elastic body and an inner surface of said outer sleeve.

2. An fluid-filled cylindrical elastic mount according to claim 1, wherein said non-compressible fluid has a kinematic viscosity of not higher than 30 centistokes.

3. A fluid-filled cylindrical elastic mount according to claim 1, wherein said elastic body has a pair of grooves which are opposed to each other in a diametrical direction of the mount, and which are open to the outer surface of said elastic body, said elastic body further having a pair of through-holes formed therethrough, which are opposed to each other in a diametrical direction perpendicular to said diametrical direction of the mount, said fluid chamber having a first portion which is defined between inner surfaces of said grooves and the inner surface of said outer sleeve, and a second portion which is defined solely by inner wall surfaces of said through-holes of the elastic body.

4. A fluid-filled cylindrical elastic mount according to claim 3, wherein said pair of grooves are arcuate grooves, and said pair of through-holes are substantially straight through-holes.

5. A fluid-filled cylindrical elastic mount according to claim 3, further comprising an intermediate sleeve disposed between said outer sleeve and said elastic body, said intermediate sleeve having a pair of windows which are aligned with said pair of grooves of said elastic body, so that the grooves are open to the outer surface of said intermediate sleeve.

6. A fluid-filled cylindrical elastic mount according to claim 1, wherein said elastic body has an annular groove which extends over the entire circumference thereof, and which is open to the outer surface of said elastic body, said fluid chamber being defined between the inner wall of said groove and the inner surface of said outer sleeve.

7. A fluid-filled cylindrical elastic mount according to claim 1, further comprising a stopper accommodated in said fluid chamber, for limiting an amount of relative displacement of said inner and outer sleeves in the radial directions thereof.

8. A fluid-filled cylindrical elastic mount according to claim 7, wherein said stopper is an integral part of said elastic body.

9. A fluid-filled cylindrical mount for flexibly connecting two members, comprising:
    an inner sleeve attached to one of the two members to be flexibly connected;
    an outer sleeve having a circumference and attached to the other of said two members, and disposed radially outwardly of said inner sleeve with a predetermined radial spacing therebetween;
    an elastic body interposed between said inner and outer sleeves for elastically connecting the inner and outer sleeves, said elastic body having a pair of grooves which are opposed to each other in a first diametrical direction of the mount and which are open to an outer surface of said elastic body, and a pair of through-holes which are formed therethrough and which are opposed to each other in a second diametrical direction perpendicular to said first diametrical direction;
    a single intermediate sleeve disposed between said outer sleeve and said elastic body, said intermediate sleeve having a pair of windows which are aligned with said pair of grooves of said elastic body and through which said pair of grooves are open to the outer surface of said elastic body;
    said outer sleeve having an inner circumferential surface which fluid-tightly closes said pair of windows of said intermediate sleeve and said pair of grooves of said elastic body;
    an inner circumferential surface of said outer sleeve and inner wall surfaces of said pair of grooves and said pair of through-holes of said elastic body cooperating with each other to define a generally annular fluid chamber which extends over an entire circumference of the mount, said generally annular fluid chamber defining a fluid passage having an effective length not greater than said circumference of said outer sleeve and which has a substantially constant cross sectional area over the entire circumference thereof, so that said mount exhibits a substantially constant damping effect for vibrations received in all radial directions of the mount; and said generally annular fluid chamber being filled with a non-compressible fluid having a kinematic viscosity of not higher than 100 centistokes, said annular fluid chamber undergoing substantially no deformation due to a rise in pressure of said fluid upon vibration application.

* * * * *